(12) United States Patent
Tsujita et al.

(10) Patent No.: US 6,815,396 B1
(45) Date of Patent: Nov. 9, 2004

(54) ADSORBENTS MADE OF STYRENE POLYMERS

(75) Inventors: Yoshiharu Tsujita, Nagoya (JP); Norio Tomotsu, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,453

(22) PCT Filed: Apr. 26, 2000

(86) PCT No.: PCT/JP00/02737

§ 371 (c)(1),
(2), (4) Date: Nov. 6, 2001

(87) PCT Pub. No.: WO00/67899

PCT Pub. Date: Nov. 16, 2000

(30) Foreign Application Priority Data

May 6, 1999 (JP) .......................... 11-125960

(51) Int. Cl.⁷ .............................. B01J 20/22
(52) U.S. Cl. ........................................ 502/401
(58) Field of Search ................... 502/401, 402

(56) References Cited

U.S. PATENT DOCUMENTS

| | | | | |
|---|---|---|---|---|
| 5,037,907 A | * | 8/1991 | Imabayashi et al. | 526/88 |
| 5,247,020 A | * | 9/1993 | Nakano et al. | 525/249 |
| 5,480,953 A | * | 1/1996 | Sugaya et al. | 526/320 |
| 5,670,587 A | * | 9/1997 | Takeuchi et al. | 526/119 |
| 5,919,723 A | * | 7/1999 | Milani et al. | 502/116 |

FOREIGN PATENT DOCUMENTS

| | | |
|---|---|---|
| JP | 9-127116 | 5/1997 |
| JP | 10-099426 | 4/1998 |
| JP | 11-057461 | 3/1999 |
| JP | 9-192653 | 7/1999 |
| JP | 2000-191868 | 7/2000 |
| WO | WO93/05068 | 3/1993 |
| WO | WO 94/11403 | 5/1994 |

OTHER PUBLICATIONS

A. L. Segre, et al., Polymeric Materials Science and Engineering, vol. 71, pp. 273–274, "Oxygen Absorption on Aromatic Polymers: AN 1H NMR Relaxation Study", 1994, no month.

K. Tsutsui, et al., Polymer, vol. 39, No. 21, pp. 5177–5182, "The Presence of Nanopores in Mesophase of Syndiotactic Polystyrene Estimated From Gas Sorption Behavior", no date.

K. Tsutsui, et al., vol. 31, No. 3, pp. 268–273, "The Isomer Effect on Complex Formation in Syndiotactic Polystyrene–Xyrene System", no date.

\* cited by examiner

Primary Examiner—Stanley S. Silverman
Assistant Examiner—Edward M. Johnson
(74) Attorney, Agent, or Firm—Oblon, Spivak, McClelland, Maier & Neustadt, P.C.

(57) ABSTRACT

(1) An adsorbent comprising a styrene polymer, which is producing by dissolving a substantially syndiotactic styrene polymer in an organic compound having an affinity for the polymer, followed by shaping it, and thereafter removing the organic compound from the shaped article. (2) For producing the adsorbent (1), the polymer solution is melt-cast into the shaped article. (3) For producing the adsorbent (1) or (2), the organic compound is removed from the shaped article through evaporation under reduced pressure. The adsorbent provided herein is effective for selectively and efficiently adsorbing an organic compound in gases or liquids.

12 Claims, No Drawings

ADSORBENTS MADE OF STYRENE POLYMERS

TECHNICAL FIELD

The present invention relates to an adsorbent comprising a substantially syndiotactic styrene polymer, more precisely, to such an adsorbent comprising a substantially syndiotactic styrene polymer, of which the pore size is equivalent to the molecular size of an organic compound to be adsorbed by it.

BACKGROUND ART

For removing an organic compound such as a hydrocarbon compound, fuel, solvent or the like, from gases or liquid that contains it, heretofore employed is a method comprising feeding a gas or liquid into an adsorption column filled with an adsorbent such as zeolite, activated alumina or the like, followed by making the organic compound adsorbed by the adsorbent to thereby remove the organic compound from the gas or liquid. The organic compound thus adsorbed by the adsorbent in the method is desorbed from it by feeding water vapor or the like into the adsorption column, expelled from the column along with the water vapor, and recovered and recycled.

However, the inorganic porous substance used in the method has some drawbacks in that it is limited in point of its crystal morphology and therefore the size of the organic compound capable of being adsorbed by it is limited, and in that its structure could not all the time correspond to the size of a specific organic compound which is intended to be adsorbed by it and therefore it cannot selectively adsorb the specific compound from a mixture of compounds having similar molecular morphologies.

In case where the device as above is difficult to install in printing factories, painting factories, etc., the solvent used in such factories is not removed and recovered satisfactorily, and a simple method of removing and recovering organic compounds is desired.

Also desired is a method of efficiently removing and recovering impurities from liquids, not requiring distillation.

The present invention is to provide an adsorbent capable of selectively and efficiently adsorbing an organic compound existing in gases or liquids.

DISCLOSURE OF THE INVENTION

We, the present inventors have assiduously studied to attain the object as above, and, as a result, have found that an adsorbent produced by forming a complex of a syndiotactic polystyrene with an organic compound followed by shaping it and removing the organic compound from the shaped article through evaporation can selectively and efficiently adsorb the organic compound. On the basis of this finding, we have completed the present invention.

Specifically, the invention provides the following:

1. An adsorbent comprising a substantially syndiotactic styrene polymer.

2. The adsorbent of above 1, which is produced by forming a complex of a substantially syndiotactic styrene polymer with at least one selected from an organic compound and a solvent of which the molecular size is equivalent to that of the organic compound, followed by shaping the complex, and thereafter removing the organic compound or the solvent from the shaped article without substantially changing the crystal structure of the styrene polymer in the shaped article.

3. The adsorbent of above 1, which is produced by dissolving or swelling a substantially syndiotactic styrene polymer in an organic compound having an affinity for the polymer, followed by shaping it, and thereafter removing the organic compound from the shaped article.

4. The adsorbent, which is produced as above 2, wherein the shaping the complex is performed by a melt-casting process.

5. The adsorbent, which is produced as above 2 or 3, wherein the removing the organic compound is performed by evaporation under reduced pressure.

6. The adsorbent, which is produced as above 2 or 3, wherein the organic compound is an aromatic compound.

7. The adsorbent of above 6, wherein the aromatic compound is at least one selected from benzene, toluene, xylene, chlorobenzene, bromobenzene, dichlorobenzene, and trichlorobenzene.

8. The adsorbent of above 1, which is for adsorbing an organic compound.

9. The adsorbent of above 1, which is produced by forming a complex of a substantially syndiotactic styrene polymer with at least one selected from an organic compound and a solvent of which the molecular size is equivalent to that of the organic compound, melt-spinning the complex into fibers after or while the complex is formed, and thereafter removing the organic compound or the solvent from the fibers without substantially changing the crystal structure of the styrene polymer in the fibers.

The complex of a substantially syndiotactic styrene polymer with an organic compound is meant to indicate that the styrene polymer therein carries the organic compound in its crystal structure with keeping its crystal structure in some degree.

BEST MODE OF CARRYING OUT THE INVENTION

Embodiments of the invention are described hereunder.

1. Substantially Syndiotactic Styrene Polymer:

Of a styrene polymer having a syndiotactic polystyrene structure (this will be referred to as "syndiotactic polystyrene" or "SPS"), the syndiotactic structure indicates the stereo-structure of the polymer, in which the side chains of phenyl groups are alternately positioned on the opposite sides relative to the main chain composed of carbon-carbon bonds, and its tacticity is determined according to the nuclear magnetic resonance of the polymer with an isotopic carbon ($^{13}$C-NMR). The tacticity to be determined according to $^{13}$C-NMR indicates the proportion of a plurality of continuous constitutional units in a polymer. For example, a polymer comprising two continuous constitutional units is referred to as a diad; that comprising three continuous constitutional units is referred to as a triad; and that comprising five continuous constitutional units is referred to as a pentad. The substantially syndiotactic styrene polymer for use in the invention generally has a racemic diad syndiotacticity of at least 75%, preferably at least 85%, or has a racemic pentad syndiotacticity of at least 30%, preferably at least 50%, including, for example, polystyrene, poly (alkylstyrenes), poly(halogenostyrenes), poly (halogenoalkylstyrenes), poly(alkoxystyrenes), poly (vinylbenzoates), hydrogenated derivatives of those polymers, their mixtures, and copolymers consisting essentially of those polymers.

The poly(alkylstyrenes) include poly(methylstyrene), poly(ethylstyrene), poly(isopropylstyrene), poly(tert-butylstyrene), poly(phenylstyrene), poly(vinylnaphthalene), poly(vinylstyrene), etc. The poly(halogenostyrenes) include poly(chlorostyrene), poly(bromostyrene), poly (fluorostyrene), etc. The poly(halogenoalkylstyrenes) include poly(chloromethylstyrene), etc.; and the poly (alkoxystyrenes) include poly(methoxystyrene), poly (ethoxystyrene), etc.

Of those styrene polymers, preferred are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene, and copolymers comprising those constitutional units.

The styrene polymer for use in the invention generally has a weight-average molecular weight of from thousands to 1,000,000, preferably from 10,000 to 500,000.

For producing the substantially syndiotactic polystyrene, any known method is employable. For example, employed is a method of polymerizing a styrene monomer (corresponding to the styrene polymer to be produced) in the presence of a catalyst of a condensation product of a titanium compound, water and a trialkylaluminium, in or not in an inert hydrocarbon solvent (Japanese Patent Laid-Open No. 187708/1987). For producing poly (halogenoalkylstyrenes) and their hydrogenated derivatives, also employable is any known method. For example, the methods described in Japanese Patent Laid-Open Nos. 46912/1989 and 178505/1989 may be employed for them.

2. Method for Producing Adsorbent that Comprises the Styrene Polymer:

For producing the adsorbent of the invention capable of selectively adsorbing an organic compound, one typical method comprises forming a complex of SPS with the intended organic compound or a solvent of which the molecular size is equivalent to that of the organic compound, then casting a solution of the complex to form an SPS film, and heating it at a relatively low temperature for a long period of time to thereby remove the organic compound or the solvent from the complex. In the adsorbent produced according to the method, formed is a site of which the size and the morphology correspond to those of the organic compound.

In the solution casting method, the SPS concentration preferably falls between 0.1 and 50% by weight, more preferably between 0.5 and 10% by weight, though depending on the solvent used. Also preferably, the casting condition is so controlled that the film has, just after cast, a thickness of from 10 to 1000 $\mu$m. If the film thickness oversteps the defined range, the desired site could not be formed in the adsorbent produced.

In the heat treatment step, the temperature may fall between −50 and 200° C., but preferably between −20 and 180° C., and the time for the treatment may fall between 10 seconds and 8 hours, but preferably between 30 seconds and 1 hour. If they overstep the defined ranges, the desired site could not be formed in the adsorbent produced.

For removing the organic compound or the solvent from it, the shaped article may be processed in vacuum. In this case, it is desirable that the system is gradually degassed in order that the desired site in the shaped article is not broken by too rapid pressure change.

Another method for producing the adsorbent of the invention comprises dissolving or swelling powder or pellets of SPS in an organic compound or in a solvent of which the molecular size is equivalent to that of the organic compound, followed by drying it in vacuum under the condition for forming a complex of SPS with the organic compound or the solvent. Also in the method, produced is the intended adsorbent having a site that corresponds to the size and the morphology of the organic compound.

Still another method for producing the adsorbent of the invention comprises forming the SPS complex, and, after or while the complex is formed, melt-spinning it into fibers in an ordinary process generally employed in producing ordinary synthetic fibers, and thereafter removing the organic compound or the solvent from the fibers. Also in the method, produced is the intended adsorbent having a site that corresponds to the size and the morphology of the organic compound.

If desired, the fibers may be drawn.

3. Organic Compound Capable of Being Adsorbed by the Adsorbent:

The organic compound to be used in producing the adsorbent of the invention may be any and every one capable of forming a complex with SPS, but is preferably one having a solubility parameter $(J/m^{-3})^{1/2}$ of from $14 \times 10^{-3}$ to $22 \times 10^{-3}$. The organic compound to dissolve or swell SPS in producing the adsorbent of the invention shall have a solubility parameter falling within the defined range; and the organic compound to be adsorbed by the adsorbent must be on the same level as that of the organic compound having been used in producing the adsorbent, in point of the molecular size. For example, in case where SPS is dissolved in p-xylene for producing an adsorbent, the adsorbent produced can adsorb p-xylene but does not adsorb m-xylene of which the molecular size is larger than that of p-xylene.

Concretely, the organic compound usable herein include aromatic compounds such as benzene, toluene, xylene, chlorobenzene, bromobenzene, dichlorobenzene, trichlorobenzene and their isomers; and non-aromatic compounds such as cis-decalin, trans-decalin, methylene chloride, chloroform, carbon tetrachloride, acetone, etc.

The solvent of which the molecular size is equivalent to that of the organic compound as above may be any and every one capable of forming a site that corresponds to the size and the morphology of the organic compound to be adsorbed by the adsorbent of the invention, and concretely includes the above-mentioned organic compounds.

The organic compound having an affinity for SPS may be the same as the organic compound mentioned above. Especially preferred for it are aromatic compounds such as those mentioned above.

The invention is described in more detail with reference to the following Examples.

EXAMPLE 1

1. Formation of Adsorbent by the Use of Organic Solvent:

Syndiotactic polystyrene (Idemitsu Petrochemical's neat polymer, having a weight-average molecular weight, Mw, of 211,000, and a ratio of weight-average molecular weight Mw to number-average molecular weight Mn, Mw/Mn of 3.45) was dissolved in p-xylene at a temperature of 100° C. to prepare a 2 wt. % solution of the polymer in p-xylene, and the resulting solution was formed into a film according to a spin-casting process. This was put into a vacuum oven, and heated therein at 90° C. under 10 mmHg for 1 hour to obtain one gram of an adsorbent. In this, p-xylene has a solubility parameter of $17.6 \times 10^{-3}$.

2. Effect of the Adsorbent:

One gram of the adsorbent was brought into contact with 100 ml of water containing 1000 ppm of p-xylene and 1000 ppm of m-xylene dissolved therein, and kept as such at room temperature for one full day. After that, the concentration of p-xylene and m-xylene in water was measured. No p-xylene was detected in water, but the concentration of m-xylene in water was not changed. The concentration analysis was effected through gas chromatography.

3. Analysis of Adsorbent:

After the test in 2, the adsorbent was then spontaneously dried, and a part of it was heated, whereupon the gas generated by it was analyzed through gas chromatography. The gas contained p-xylene.

This confirms that p-xylene was adsorbed by the adsorbent, and p-xylene can be removed and recovered by heating the adsorbent.

EXAMPLE 2

1. Formation of Adsorbent by the Use of Organic Solvent:

20 g of syndiotactic polystyrene (Idemitsu Petrochemical's neat polymer, having a weight-average molecular weight, Mw, of 211,000, and a ratio of weight-average molecular weight Mw to number-average molecular weight Mn, Mw/Mn of 3.45) was swollen in 100 ml of toluene at 80° C., and this was put into a vacuum oven and heated therein at 80° C. under 10 mmHg for 1 hour to obtain 20 g of an adsorbent. In this, toluene has a solubility parameter of $17.8 \times 10^{-3}$.

2. Effect of the Adsorbent:

5 g of the adsorbent was brought into contact with 500 ml of water containing 1000 ppm of p-xylene and 1000 ppm of m-xylene dissolved therein, and kept as such at room temperature for one full day. After that, the concentration of p-xylene and m-xylene in water was measured. No p-xylene was detected in water, but the concentration of m-xylene in water was not changed. The concentration analysis was effected through gas chromatography.

EXAMPLE 3

The same process as in Example 2 was repeated, except that methanol and not water was used in the step 2 of Example 2.

No p-xylene was detected in water, but the concentration of m-xylene in water was not changed.

EXAMPLE 4

The same process as in Example 2 was repeated, except that hexane (having a solubility parameter of $14.6 \times 10^{-3}$) and not m-xylene was used in the step 2 of Example 2.

No p-xylene was detected in water, but the concentration of hexane in water was not changed.

EXAMPLE 5

The same process as in Example 2 was repeated, except that toluene (having a solubility parameter of $17.8 \times 10^{-3}$) and not p-xylene was used in the step 2 of Example 2.

No toluene was detected in water, but the concentration of m-xylene in water was not changed.

EXAMPLE 6

The same process as in Example 2 was repeated, except that chloroform (having a solubility parameter of $18.6 \times 10^{-3}$) and not toluene was used in the step 1 of Example 2 and that chloroform and not p-xylene was used in the step 2 thereof.

No chloroform was detected in water, but the concentration of m-xylene in water was not changed.

INDUSTRIAL APPLICABILITY

The present invention provides an adsorbent capable of selectively and efficiently adsorbing an organic compound in gases or liquids.

The organic compound adsorbed by the adsorbent can be efficiently recoverered.

What is claimed is:

1. An adsorbent comprising
a shaped article of substantially syndiotactic styrene polymer having a crystal structure and crystal lattice holes therein, which is produced by forming a complex of a substantially syndiotactic styrene polymer with at least one selected from an organic compound and a solvent having a molecular size equivalent to that of the organic compound, followed by shaping the complex into a shaped article having a crystal lattice structure wherein the article comprises the polymer and at least one selected from an organic compound and a solvent, and thereafter removing the organic compound or the solvent from the shaped article without substantially changing crystal structure of the styrene polymer in the shaped article; thereby producing crystal lattice holes that are substantially the same size as the molecular size of the organic compound or solvent removed.

2. The adsorbent as claimed in claim 1, which is produced by dissolving or swelling a substantially syndiotactic styrene polymer in an organic compound having an affinity for the polymer, followed by shaping it, and thereafter removing the organic compound from the shaped article.

3. The adsorbent, which is produced as claimed in claim 1, wherein the shaping the complex is performed by a melt-casting process.

4. The adsorbent, which is produced as claimed in claim 1, wherein the removing the organic compound is performed by evaporation under reduced pressure.

5. The adsorbent, which is produced as claimed in claim 1, wherein the organic compound is an aromatic compound.

6. The adsorbent as claimed in claim 5, wherein the aromatic compound is selected from the group consisting of benzene, toluene, xylene, chlorobenzene, bromobenzene, dichlorobenzene, and trichlorobenzene.

7. The adsorbent as claimed in claim 1, which is for adsorbing an organic compound.

8. The adsorbent as claimed in claim 1, which is produced by forming a complex of a substantially syndiotactic styrene polymer with at least one selected from an organic compound and a solvent of which the molecular size is equivalent to that of the organic compound, melt-spinning the complex into fibers after or while the complex is formed, and thereafter removing the organic compound or the solvent from the fibers not substantially changing the crystal structure of the styrene polymer in the fibers.

9. The adsorbent, which is produced as claimed in claim 2, wherein removing the organic compound is performed by evaporation under reduced pressure.

10. The adsorbent, which is produced as claimed in claim 2, wherein the organic compound is an aromatic compound.

11. The adsorbent as claimed in claim 10, wherein the aromatic compound is selected from the group consisting of benzene, toluene, xylene, chlorobenzene, bromobenzene, dichlorobenzene, and trichlorobenzene.

12. A method of making an adsorbent, comprising
forming a complex of a substantially syndiotactic styrene polymer with at least one selected from an organic compound and a solvent having a molecular size equivalent to that of the organic compound; followed by
shaping the complex into a shaped article having a crystal lattice structure wherein the article comprises the polymer and at least one selected from an organic compound and a solvent; and then followed by
removing the organic compound or the solvent from the shaped article without substantially changing crystal structure of the styrene polymer in the shaped article; thereby producing crystal lattice holes that are substantially the same size as the molecular size of the organic compound or solvent removed.

* * * * *